(12) United States Patent
Vriens et al.

(10) Patent No.: US 6,397,187 B1
(45) Date of Patent: *May 28, 2002

(54) SYSTEM FOR OBTAINING ASSISTANCE IN OPERATING AN APPARATUS

(75) Inventors: Leonarda J. M. Vriens; Henricus J. C. Kuijpers, both of Eindhoven; Marc G. D. Steen, Amsterdam, all of (NL)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/209,084

(22) Filed: Dec. 10, 1998

(30) Foreign Application Priority Data

Dec. 11, 1997 (EP) .............................. 97203892

(51) Int. Cl.[7] ................................. G10L 21/06
(52) U.S. Cl. ....................................... 704/275
(58) Field of Search ................. 704/270, 275, 704/272

(56) References Cited

U.S. PATENT DOCUMENTS

| 4,884,199 | A | * | 11/1989 | Boothroyd et al. ......... 345/326 |
|---|---|---|---|---|
| 5,309,351 | A | * | 5/1994 | McCain et al. ............. 364/132 |
| 5,347,306 | A | | 9/1994 | Nitta ............................. 348/15 |
| 5,479,490 | A | * | 12/1995 | Nakashima ................. 379/74 |
| 5,491,743 | A | | 2/1996 | Shiio et al. ................. 379/202 |
| 5,548,632 | A | * | 8/1996 | Walsh et al. ................. 379/58 |
| 5,727,950 | A | * | 3/1998 | Cook et al. ................. 434/350 |
| 6,185,379 | B1 | * | 3/2001 | Lay et al. ..................... 399/11 |

FOREIGN PATENT DOCUMENTS

| JP | 62127967 A | | 6/1987 | |
| JP | 62127967 A | * | 6/1987 | ........... G06F/15/24 |

* cited by examiner

*Primary Examiner*—Richemond Dorvil
(74) *Attorney, Agent, or Firm*—Laurie E. Gathman

(57) ABSTRACT

The invention relates to a system for obtaining assistance in operating an apparatus. A television receiver is provided with a microphone and a dedicated operator call button and connected to a communication network. When a user presses the button, a connection is established to a help desk operator, enabling the user and the operator to speak to each other. The operator can make the television receiver show a picture of the control panel of the apparatus for which assistance is requested, and generate control signals for visualizing operations on the control panel. An animated image of the operator is shown on the television receiver, controlled by the sound level of the operator's voice, in order to elucidate the source of the voice speaking to the user.

20 Claims, 1 Drawing Sheet

SYSTEM FOR OBTAINING ASSISTANCE IN OPERATING AN APPARATUS

BACKGROUND OF THE INVENTION

The present invention relates to a help system for obtaining assistance in operating an apparatus, comprising a display system, a communication network and an operator terminal, the display system being provided with operator call means for establishing a connection to the operator terminal via the communication network in response to a user command.

Such a system is known from the English abstract of JP 62-127967. Upon pressing an operator call button of the known system, an audio and video connection is established with a help-desk operator. The video connection enables the operator to support his explanation by gestures and pictures.

A disadvantage of the known system, however, is that expensive hardware is required and in most cases the bandwidth needed for transporting the video information is not available.

SUMMARY OF THE INVENTION

An objective of the present invention is to provide a help system which offers some of the benefits of a video connection without the need for expensive hardware and a broadband network. To that end, the help system according to the invention is characterized in that the display system is conceived to store and display a picture of control means of the apparatus, and to visualize an operation upon the control panel in response to control signals obtained from the communication network, the operator terminal being conceived to generate said control signals and send the control signals via the communication network to the display system. The bandwidth required for transporting the control signals is much smaller than the bandwidth which would have been required for sending a video recording of the control panel which is operated by a help-desk operator.

The display system may comprise a microphone for enabling a user of the apparatus to verbally communicate a problem to the operator terminal. Similarly, the operator terminal may be equipped with a further microphone, enabling the operator to verbally communicate with the user. Alternatively, the operator terminal could be equipped with a speech recognition system and an automatic answering system, enabling the operator terminal to respond automatically to spoken messages from the user. Microphones may be dispensed with at all when the dialog is fully automated, e.g. involving screen menus or numeric key selections.

Features of the visualization may be the usage of a pointer for indicating a particular control, and highlighting or animation techniques which are well known from graphical computer applications.

An embodiment of the help system is characterized in that the display system comprises permanent storage means for storing the picture, and that the display system is conceived to show the stored picture upon receiving an identification signal from the communication network, the operator terminal being conceived to generate the identification signal and send the identification signal via the communication network to the display system. By storing the picture of the control panel permanently in the display system, no video information need be sent via the communication network, only control signals.

A further embodiment of the help system is characterized in that the operator terminal is conceived to send the picture via the communication network to the display system, the display system being conceived to receive the picture from the communication network and store the picture in volatile storing means. This solution is more flexible, because also pictures of control panels can be shown which are not known in advance. This is particularly useful if the assistance concerns the operation of an apparatus other than the display system itself, e.g. a VCR or a microwave oven.

A further embodiment of the help system is characterized in that the display system comprises further storage means for storing an image of an operator, and that the display system is conceived to show the image of the operator which is stored in the further storage means. This feature gives the user an additional indication that a connection with a help-desk operator has been established.

A further embodiment of the help system is characterized in that the further storage means comprise a permanent memory for storing the image of the operator, and that the display system is conceived to show the image upon receiving a further identification signal from the communication network, the operator terminal being conceived to generate the further identification signal and send the further identification signal via the communication network to the display system. By storing the image of the operator permanently in the display system, no video information need to be sent via the communication network. Of course, resemblance between the image and the operator cannot be guaranteed in this way. To alleviate this drawback, the operator terminal could comprise additional means for sending a selection code, enabling the operator to choose the pictorial representation, e.g. a female face.

A further embodiment of the help system is characterized in that the operator terminal is conceived to send the image of the operator via the communication network to the display system, the display system being conceived to receive the image of the operator from the communication network and store it in the further storage means. In this way, resemblance between the picture and the operator can be guaranteed.

A further embodiment of the help system is characterized in that the further storage means contains a plurality of pictures, and that the display system comprises animation means for animating the image of the operator by alternately showing one of at least two of said pictures. By animating the picture of the operator, the suggestion is strengthened that it belongs to the interlocutor. A preferred embodiment is characterized in that the animation means are conceived to be controlled by at least the sound level of a sound signal obtained from the operator terminal, and that the animation means are conceived to alternate at least two pictures of an operator which differ at least in the state of the mouth of the operator. Techniques for animating pictures which are stored locally are known from teleconferencing systems, see for instance U.S. Pat. No. 5,347,306.

A further embodiment of the help system is characterized in that the operator terminal comprises controlling means for controlling the display system by sending further control signals via the communication network to the display system, and that the display system is conceived to receive and interpret the further control signals and operate accordingly. This is advantageous when the assistance concerns the operation of the display system itself, particularly if the display system is combined with another complex apparatus, e.g. a television receiver. Operations demonstrated by the operator need not be imitated by the user, but are executed automatically, which quickens the communication.

A further embodiment of the help system is characterized in that the display system is a television receiver. As a result, it is not necessary to purchase a dedicated help system, because TV-receivers are available in most homes. In a preferred embodiment, the TV receiver is characterized in that the television receiver is conceived to mute the TV sound automatically during a communication between a user and an operator. This enhances the intelligibility of the operator's voice.

The invention further relates to a display system for use in a help system according to the invention, and to a method of obtaining assistance in operating an apparatus, comprising a step of establishing a connection to an operator terminal.

These and other aspects of the invention will be apparent from and elucidated with reference to the embodiments described hereinafter.

DETAILED DESCRIPTION OF THE PREFERRED EMBODIMENTS

Figure 1:
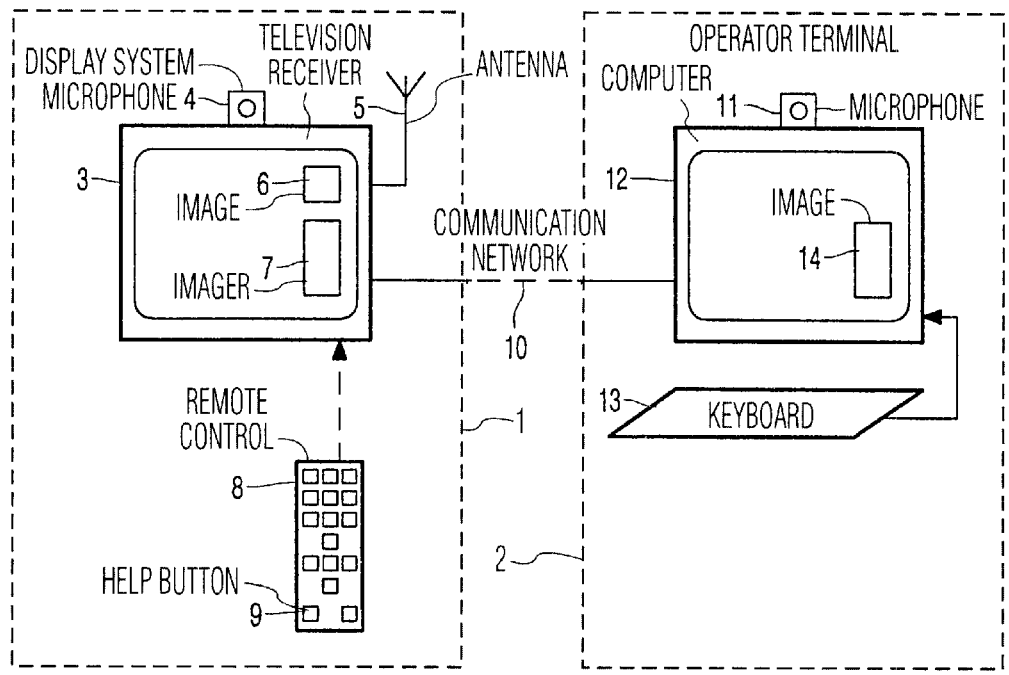
FIG. 1 shows a diagram of a help system according to the invention.

FIG. 1 shows an embodiment of a help system according to the invention. It comprises a display system 1 which is connected to a communication network 10 and an operator terminal 2. The display system 1 comprises a television receiver 3, which is provided with a microphone 4 and an antenna 5. The television receiver 3 can be operated by means of the remote control 8, which comprises a help button 9 as an embodiment of the operator call means. Another embodiment could be a menu item in an on-screen menu, or any other mechanism for entering user commands.

On the screen of the television receiver 3 two images 6 and 7 can be presented, image 6 being an animation of an operator's face and image 7 being a picture of a control panel, e.g. the remote control 8.

The operator terminal 2 comprises a computer 12 which is provided with a microphone 11 and connected to the communication network 10. A keyboard 13 is connected to the computer 12. On the screen of the computer 12 an image 14 of a control panel can be presented.

Figure 2:
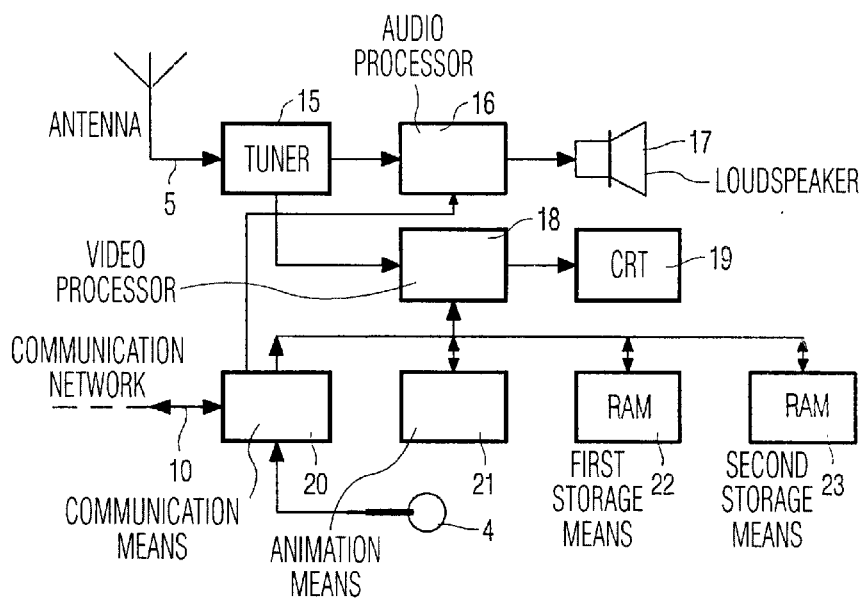
FIG. 2 shows a diagram of a display system according to the invention.

FIG. 2 shows a diagram of the television receiver 3. The signal obtained from the antenna 5 is processed by the tuner 15 and split into an audio signal and a video signal. The audio signal is further processed by an audio processor 16 and a loudspeaker 17. The video signal is further processed by a video processor 18 and presented on a screen 19. Communication means 20 are conceived to send audio signals to the communication network 10 and to the audio processor 16. The communication means 20 can receive audio signals from the communication network 10 and from the microphone 4, and image and control signals from the communication network 10. Animation means 21 can load pictures from first storage means 22 and second storage means 23 and send them to the video processor 18.

Figure 3:
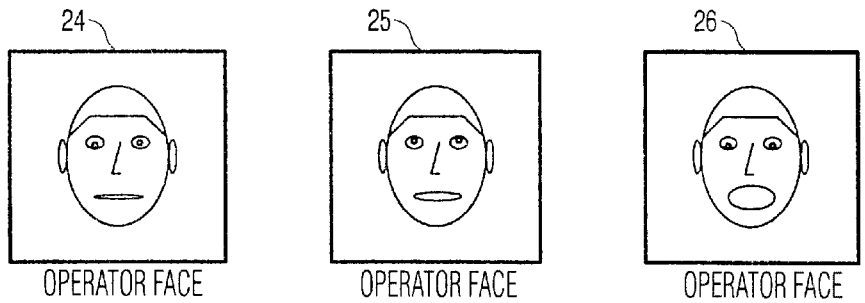
FIG. 3 shows pictures of an operator's face to be used for animation.

When a user presses the help button 9, the television receiver 3 establishes a connection to a help-desk operator via the communication network 10. If no connection can be established a message is presented on the screen 19. The operator is equipped with the computer 12. From the start of the communication between the user and the operator, they can talk to each other, using the microphones 4 and 11. At the start of the communication, three pictures are sent from the operator terminal 2 via the communication network 10 to the television receiver 3, which stores them in the second storage means 23. The pictures represent three images of the operator's face, as shown in FIG. 3. Picture 24 shows the operator with the mouth closed, picture 25 shows the operator with the mouth half open, and picture 26 shows the operator with the mouth open. After receiving the three pictures, the animation means 21 cause the pictures to be presented in an alternating way as the image 6 on the screen 19. The alternation is controlled by the volume of the sound produced by the operator's voice. If the volume is high, picture 26 is shown, if the volume is low, picture 25 is shown, while during silence picture 24 is shown. Instead of alternating complete pictures, the image may be composed of a static part, e.g. a background picture, and two or more dynamic parts which are alternately projected into the image. In an alternative embodiment the pictures are stored permanently in permanent storage means, replacing the second storage means 23. As a result, it is no longer necessary to send the pictures via the communication network 10. In this embodiment resemblance of the pictures to the operator's face cannot be guaranteed. The operator terminal 2 could be provided with additional means (not shown) for generating an identification signal for activating one of various pre-defined sets of pictures. For example, if the operator is a woman, she can activate a set of pictures which represent a woman's face.

The help system according to the invention enables a picture 7 of a control panel to be shown on the screen 19. This can be the control panel of another apparatus, e.g. a VCR or a microwave oven, or a control panel of the television receiver 3 itself, e.g. the remote control 8. After informing the operator as to which apparatus assistance is requested for, the operator can enter an identification code, identifying a particular control panel. A picture of that particular control panel is then sent from the operator terminal 2 via the communication network 10 to the television receiver 3, which stores the picture in the storage means 22. The animation means 21 can send the picture to the video processor 18, which causes it to be presented on the screen 19 as the image 7. The animation means 21 can perform animation techniques on the picture of the control panel, such as moving a cursor over the picture and visualizing the pressing of a button on the control panel, e.g. by highlighting techniques, which are well known from graphical computer programs. This animation is controlled by control signals which are generated by the operator using the keyboard 14, or any other input means, while inspecting an image 14 on the screen of the computer 12 which is substantially identical to the image 7 on the screen 19 of the television receiver 3.

In an alternative embodiment assistance can only be obtained for a pre-defined set of devices of which the control panels are stored permanently in the storage means 22. In that embodiment only the control signals for controlling the animation need be sent via the communication network 10 to the television receiver 3. In the most restricted case, only assistance concerning the television receiver 3 can be obtained, but in that case the operator terminal could be provided with control means (not shown) for controlling the operation of the television receiver 3 by means of control signals which are sent via the communication network 10. This enables the operator, besides explaining how a certain goal is achieved, to show the effect of the operations required for achieving the goal. Especially for complex tasks this could be a useful addition.

Connections which would be established by accidentally pressing the operator call button can be avoided by asking the user for confirmation, e.g. by means of a screen message which asks the user to press the operator call button a second time. Other procedures, such as a time-out on the operator call button, or an interactive conversation using the screen, are well known and can be applied as well.

If the television receiver 3 is producing sound just before the connection established, the sound is muted partially or completely, in order to enhance the intelligibility of the operator's voice.

In summary, the invention relates to a system for obtaining assistance in operating an apparatus. A television receiver is provided with a microphone and a dedicated operator call button and connected to a communication network. When a user presses the button, a connection is established to a help desk operator, enabling the user and the operator to speak to each other. The operator can make the television receiver show a picture of the control panel of the apparatus for which assistance is requested, and generate control signals for visualizing operations on the control panel. An animated image of the operator is shown on the television receiver, controlled by the sound level of the operator's voice, in order to elucidate the source of the voice speaking to the user.

What is claimed is:

1. An interactive display system for obtaining assistance in operating an apparatus, comprising:

operator call means for establishing a connection to a remote operator terminal;

a communication network enabling communication between the display system and the remote operator terminal such that the remote operator terminal responds to a help request for help in operating the apparatus;

first storage means, for storing a picture of a control device which operates the apparatus;

a device which responds to at least one control signal from the remote operator terminal which causes the picture of the control device to appear on the display, the picture demonstrating how to use the control device to activate a feature of the apparatus.

2. A display system according to claim 1, comprising: a first microphone, and being adapted to send signals obtained from said first microphone via the communication network to the operator terminal.

3. A display system according to claim 2, wherein the operator terminal comprises a second microphone, the operator terminal being adapted to send signals obtained from said second microphone via the communication network to the display system.

4. A display system according to claim 1, wherein the operator terminal comprises a speech recognition system for recognizing speech input from the display system and an automatic answering system for generating an answer in response to said speech input, the operator terminal being adapted to send said answer via the communication network to the display system.

5. A display system according to claim 1, wherein the control signals define the position of a cursor in the picture.

6. A display system according to claim 1, wherein the control signals define temporary changes in at least parts of the picture.

7. A display system according to claim 6, wherein a second storage means comprises a permanent memory for storing an image of the operator, and the display system is conceived to show the image upon receiving a second identification signal from the communication network, the operator terminal being conceived to generate the second identification signal and send the second identification signal via the communication network to the display system.

8. A display system according to claim 6, wherein the operator terminal is conceived to send an image of the operator via the communication network to the display system, the display system being conceived to receive the image of the operator from the communication network and store it in a second storage means.

9. A display system according to claim 6, wherein a second storage means contains a plurality of pictures, and the display system comprises animation means for animating the image of an operator by alternately showing one of at least two of said pictures.

10. A display system according to claim 1, comprising first permanent storage means for storing the picture, and conceived to show the stored picture upon receiving a first identification signal from the communication network, the operator terminal being conceived to generate the first identification signal and send the first identification signal via the communication network to the display system.

11. A display system according to claim 1, wherein the operator terminal is conceived to send the picture via the communication network to the display system, the display system being conceived to receive the picture from the communication network and store the picture in volatile storing means.

12. A display system according to claim 1, wherein the display system comprises second storage means for storing an image of an operator, and is conceived to show the image of the operator which is stored in the second storage means.

13. A display system according to claim 9, wherein an animation means is conceived to be controlled by at least a sound level of a sound signal obtained from the operator terminal, and the animation means is conceived to alternate at least two pictures of an operator which differ at least in a state of the mouth of the operator.

14. A display system according to claim 1, wherein the operator terminal comprises controlling means for controlling the display system by sending further control signals via the communication network to the display system, and the display system is conceived to receive and interpret the further control signals and operate accordingly.

15. An interactive display system conceived to be used in a help system, for obtaining help in operating an apparatus, comprising operator call means, for establishing a connection to a remote operator terminal, and a microphone, and conceived to be connected to a communication network and to show a picture of at least a part of a control device for operating an apparatus, demonstrating how to use the control device, the picture being controlled by control signals obtained from the communication network.

16. A display system according to claim 15, wherein the display system is a television receiver.

17. A television receiver according to claim 16, wherein the television receiver is conceived to mute the TV sound automatically during a communication between a user and an operator.

18. An interactive method of obtaining assistance in operating an apparatus, comprising the steps of:

(a) establishing a connection to a remote operator terminal for obtaining a response to a help request for help in operating the apparatus; and (b) showing a picture of at least a part of a control device for the apparatus which demonstrates how to use the apparatus, the picture being actuated by control signals which are sent by the remote operator terminal.

19. A method according to claim 18, wherein the method further comprises the step of showing an image of an operator.

20. A method according to claim 19, wherein the method further comprises the step of animating the image of the operator, controlled by at least the sound level of a sound signal obtained from the operator terminal.

* * * * *